United States Patent
Webster et al.

(10) Patent No.: US 10,316,974 B2
(45) Date of Patent: Jun. 11, 2019

(54) AIR RIDING SEAL ARRANGEMENT

(71) Applicant: ROLLS-ROYCE plc, London (GB)

(72) Inventors: Helen Webster, Derby (GB); Luke Hamilton, Reading (GB); Murad Khader, Derby (GB); Robert Grasse, Nottingham (GB)

(73) Assignee: ROLLS-ROYCE plc, London (GB)

(*) Notice: Subject to any disclaimer, the term of this patent is extended or adjusted under 35 U.S.C. 154(b) by 63 days.

(21) Appl. No.: 15/681,829

(22) Filed: Aug. 21, 2017

(65) Prior Publication Data
US 2018/0073639 A1 Mar. 15, 2018

(30) Foreign Application Priority Data
Sep. 9, 2016 (GB) .................................. 1615352.0

(51) Int. Cl.
*F16J 15/40* (2006.01)
*F01D 11/04* (2006.01)
(Continued)

(52) U.S. Cl.
CPC .............. *F16J 15/40* (2013.01); *F01D 11/04* (2013.01); *F16J 15/164* (2013.01); *F01D 25/22* (2013.01); *F05D 2240/53* (2013.01)

(58) Field of Classification Search
CPC .......... F16J 15/40; F16J 15/164; F01D 11/04; F05D 2240/53; F15J 15/441
(Continued)

(56) References Cited

U.S. PATENT DOCUMENTS 3,190,661 A * 6/1965 Wahl .................... F16J 15/30
277/409
3,554,559 A * 1/1971 Dahlheimer ............. F16J 15/36
277/348
(Continued)

FOREIGN PATENT DOCUMENTS

EP 0470409 A1 2/1992
EP 2634461 A2 9/2013
(Continued)

OTHER PUBLICATIONS

Feb. 10, 2017 Search Report issued in British Patent Application No. 1615352.0.

*Primary Examiner* — Eugene G Byrd
(74) *Attorney, Agent, or Firm* — Oliff PLC

(57) ABSTRACT

Air-riding seal arrangement between two components are rotatable relative to each other about a rotation axis. The seal arrangement includes an axially slidable carrier module mounted to one component and runner provided by other components. The carrier module and runner have respective and opposing annular sealing faces in a seal arrangement normal operation are axially spaced to form an air-seal therebetween separating a high-pressure region at one side of the air-seal from low-pressure region at the other side. The carrier module has a front and rear portions, and carrier module sealing face is provided by the front portion. The front portion has first and second rotation positions relative to the rear portion, the first rotation position being in normal operation, and second rotation position being in event of high speed touchdown of the annular sealing faces when contact between sealing faces rotates the front portion to the second rotation position.

15 Claims, 5 Drawing Sheets

(51) Int. Cl.
*F16J 15/16* (2006.01)
*F01D 25/22* (2006.01)

(58) Field of Classification Search
USPC ....... 277/370, 371, 411, 409, 408, 401, 372, 277/373
See application file for complete search history.

(56) References Cited

U.S. PATENT DOCUMENTS

| | | | | |
|---|---|---|---|---|
| 3,628,799 A * | 12/1971 | Wiese | ............... | F16J 15/3416 277/401 |
| 3,782,737 A * | 1/1974 | Ludwig | ............... | F16J 15/342 277/400 |
| 4,749,199 A * | 6/1988 | Gresh | ............... | F16J 15/008 277/348 |
| 4,776,261 A * | 10/1988 | Larson | ............... | F16J 1/08 277/431 |
| 6,070,881 A * | 6/2000 | Longree | ............... | F16J 15/40 277/409 |
| 6,135,458 A * | 10/2000 | Fuse | ............... | F16J 15/342 277/382 |
| 6,145,843 A * | 11/2000 | Hwang | ............... | F16J 15/442 277/400 |
| 6,386,547 B2 * | 5/2002 | Wu | ............... | F16J 15/3488 277/400 |
| 6,431,551 B1 * | 8/2002 | Fuse | ............... | F16J 15/342 277/390 |
| 6,494,460 B2 * | 12/2002 | Uth | ............... | F16J 15/342 277/399 |
| 6,719,296 B2 * | 4/2004 | Brauer | ............... | F01D 11/003 277/409 |
| 6,758,477 B2 * | 7/2004 | Brauer | ............... | F01D 11/02 277/379 |
| 6,932,348 B2 * | 8/2005 | Takahashi | ............... | F16J 15/3404 277/359 |
| 7,144,016 B2 * | 12/2006 | Gozdawa | ............... | F16J 15/342 277/399 |
| 7,819,405 B2 * | 10/2010 | Ohama | ............... | F16J 15/3404 277/370 |
| 7,883,093 B2 * | 2/2011 | Ueda | ............... | F16J 15/342 277/371 |
| 8,439,365 B2 * | 5/2013 | Haynes | ............... | F16J 15/441 277/371 |
| 8,740,224 B2 * | 6/2014 | Zheng | ............... | F16J 15/344 277/370 |
| 2002/0079648 A1 * | 6/2002 | Uth | ............... | F16J 15/342 277/401 |
| 2002/0096835 A1 * | 7/2002 | Azibert | ............... | F16J 15/3488 277/370 |
| 2004/0232622 A1 * | 11/2004 | Gozdawa | ............... | F16J 15/342 277/401 |
| 2005/0067788 A1 * | 3/2005 | Liang | ............... | F01D 11/005 277/409 |
| 2005/0134002 A1 * | 6/2005 | Elliott | ............... | F04D 29/126 277/371 |
| 2007/0108704 A1 * | 5/2007 | Craig | ............... | F01D 11/003 277/370 |
| 2007/0253809 A1 * | 11/2007 | Glynn | ............... | F01D 11/04 415/174.2 |
| 2008/0018054 A1 * | 1/2008 | Herron | ............... | F01D 11/02 277/409 |
| 2010/0148448 A1 * | 6/2010 | Pinto | ............... | B22F 5/106 277/371 |
| 2010/0270749 A1 * | 10/2010 | Oshii | ............... | F16J 15/004 277/361 |

FOREIGN PATENT DOCUMENTS

GB 734685 A 8/1955
WO WO-2011095195 A1 * 8/2011 ............ F16J 15/342

\* cited by examiner

FIG. 6A
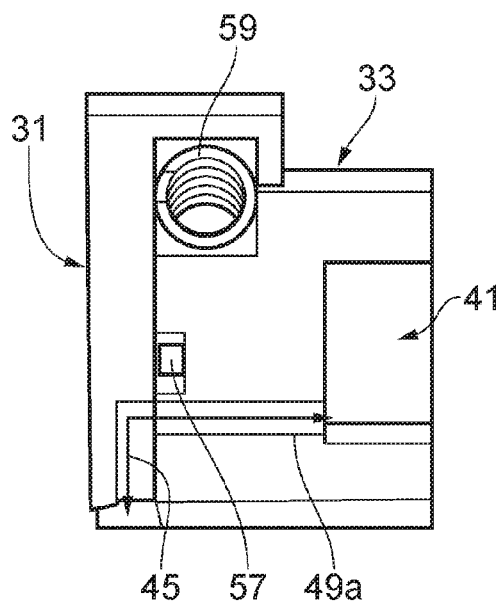
FIG. 6B
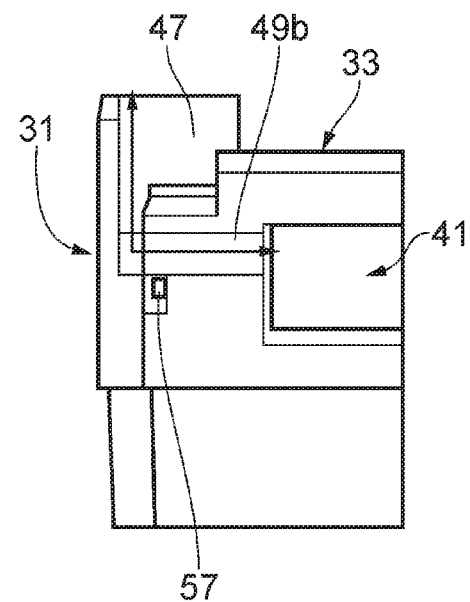
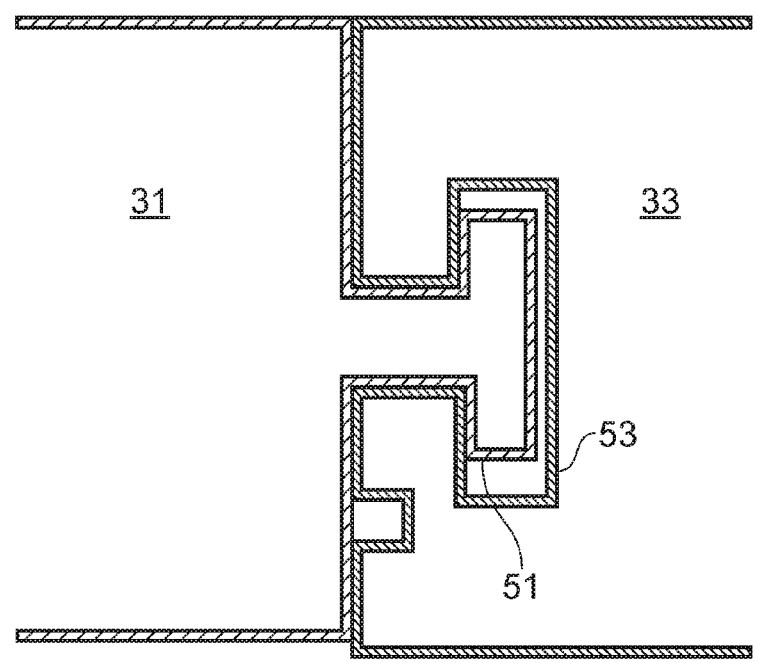
FIG. 7

AIR RIDING SEAL ARRANGEMENT

FIELD OF THE INVENTION

The present invention relates to an air riding seal arrangement.

BACKGROUND

Air riding seals can be used for providing a seal between relatively rotating parts. In many cases one of the parts will be stationary, but air riding seals may also be used between two rotating parts, which may rotate in the same direction as each other, or in opposite directions. For ease of explanation, parts will be referred to in this specification as a rotating part and a stationary part, but it will be appreciated that the "stationary" part may itself rotate.

A typical air riding seal comprises a runner which is mounted on the rotating part and a stationary element which is mounted on the stationary part. The runner may, for example, be made from a metallic material, and the stationary element may be made from a self-lubricating material such as carbon. The stationary element may also be referred to as a carrier module. Whilst the runner may be mounted on the rotating part, the runner may also be integrally formed in the rotating part. For example, in the case that the rotating part is a shaft, the runner may be e.g. a flange formed in, and extending radially from, the shaft.

The runner and the carrier module have axial sealing faces which are disposed face-to-face. When relative rotation occurs between the rotating and stationary parts, a film of air is drawn between the sealing faces, causing them to lift off from each other so that a cushion of air is formed between them. Consequently, there is no face-to-face contact between the runner and the stationary element once the relative speed of rotation exceeds a threshold value, and sliding friction between the faces is substantially eliminated. The gap between the faces is very small, and effectively prevents flow from one side of the seal to the other.

Air-riding seals may be used in gas turbine engines. For example, the seals may provide sealing between shafts of the engine, rotating at different speeds, or between a rotating shaft and a stationary component. Air riding seals may be employed to seal between regions of the engine containing air at different pressures, or to prevent escape of a liquid, such as lubricating oil, from a region in which it is to be confined.

A conventional air-riding seal arrangement is shown schematically in FIG. 1. Here, the air-riding seal arrangement provides a seal between a first component in the form of a rotating shaft 125 and a second component in the form of a housing 127. The shaft is rotatable about an axis X-X, and it will be appreciated that the seal arrangement is substantially axis-symmetric about this axis.

A runner 129 is mounted on the shaft 125 so that the runner 129 is rotationally fixed with respect to the shaft 125.

A front portion 131 and a rear portion 133 of a carrier module are rotationally fixed with respect to the housing 127, and consequently do not rotate with the shaft 125. The carrier member is biased by a spring formation 135 towards the runner 129.

The runner 129 and the carrier member have oppositely disposed annular sealing faces 137, 139 which, when the shaft 125 is stationary, are in contact with each other under the influence of the spring 135 formation. The sealing face 139 of the runner is provided with formations (not visible) which provide an aerodynamic lifting force when the shaft rotates. The formations may, for example, take the form of spiral grooves in the sealing face. However, such formations are not present in all conventional air-riding seal arrangements, as in many cases the pressure difference across the seal provides sufficient aerodynamic lifting force.

When the shaft 125 rotates about the axis X-X at a speed above a threshold, the aerodynamic lift generated between the sealing faces 137 and 139 causes the carrier module to be displaced away from the sealing face 139 of the runner 129 by a small distance. The resulting gap is filled by a relatively stiff layer of air which not only prevents face-to-face contact between the sealing faces 137, 139, but also prevents flow across the seal, i.e. from a first region B to a second region A. Consequently, the seal arrangement is able to maintain a pressure difference between the regions A and B. It can also prevent the transfer of fluid between the regions A and B. For example, the region A may be a bearing chamber accommodating a lubricated bearing (not shown), with the result that the region A may contain a mist of lubricant droplets in air. It is also possible that lubricant delivery systems, such as jets, may supply lubricant to the region A, for example to supply lubricant to the bearing. The seal arrangement shown in FIG. 1 may thus be able to prevent migration of the lubricant from the region A to the region B.

As well as the primary seal formed between the sealing faces 137, 139, a secondary sealing element 140 such as a PTFE ring seal may be provided to prevent flow through a secondary flow path behind the carrier module.

However, such conventional air-riding seal arrangements can suffer a problem of high-speed touchdown (HSTD) of the sealing faces. High speed touchdown occurs when the two sealing faces contact, rather than maintaining an air-riding state. This contact may generate a large heat input e.g. of many kW, which may cause wear and possibly failure of the faces and of the secondary sealing. Conventional air-riding seal arrangements do not provide any 'safe-fail' features, or features which are capable of recovering to an air-riding state from an HSTD event. Thus conventionally, the only way to treat this risk of failure is simply to minimise the probability of an HSTD event occurring. This limits present use of air-riding seals, due to the risk of component failure in use.

SUMMARY

Accordingly, it is desirable to provide an air-riding seal arrangement which can reduce or eliminate the risk of component failure when an HSTD event occurs.

Thus, in a first aspect, the present invention provides an air-riding seal arrangement between two components that are rotatable relative to each other about a rotation axis, the seal arrangement including an axially slidable carrier module mounted to one of the components and a runner provided by the other of the components, the carrier module and the runner having respective and opposing annular sealing faces which, in a normal operation of the seal arrangement, are axially spaced to form an air seal therebetween separating a high pressure region at one side of the air seal from a low pressure region at the other side of the air seal, wherein:

the carrier module has a front portion and a rear portion,
the sealing face of the carrier module being provided by the front portion, and the front portion having first and second rotation positions relative to the rear portion, the first rotation position being adopted in the normal operation, and the second rotation position being adopted in the event of high speed touchdown of the annular sealing faces when contact between the sealing faces rotates the front portion to the second rotation position;

the seal arrangement further includes a pressurisable chamber formed behind the rear portion of the carrier module, the pressure in the pressurisable chamber producing a force urging the carrier module towards the runner;

a first one of the front and rear portions of the carrier module has one or more pressurisation channels and one or more depressurisation channels formed therein, the pressurisation channels extending to the high pressure region at one side of the air seal, and the depressurisation channels extending to the low pressure region at the other side of the air seal;

the other one of the front and rear portions of the carrier module is adapted such that: (i) in the first rotation position the, or each, pressurisation channel is opened to fluidly connect the pressurisable chamber with the high pressure region, and the depressurisation channel(s) is closed; and (ii) in the second rotation position the pressurisation channel(s) is closed, and the, or each, depressurisation channel is opened to fluidly connect the pressurisable chamber with the low pressure region, thereby reducing the force urging the carrier module towards the runner.

Accordingly, the present invention provides an air-riding seal arrangement which, in the event of HSTD of the sealing faces, is able to provide at least a "safe-fail" mode, and preferably is capable of recovering to an air-riding state from HSTD. During normal operation when the front portion of the carrier module is in the first rotation position, the pressurisable chamber is pressurised by air flow through the pressurisation channel(s) from the high pressure side of the seal arrangement. During HSTD, a torque is applied to the front portion of the carrier module through the contact between the sealing faces, and this torque causes rotation of the front portion of the carrier module relative to the rear portion to move the front portion of the carrier module from the first rotation position into the second rotation position. When in the second rotation position, the pressure within the pressurisable chamber is relieved to the low pressure side of the seal arrangement, through the depressurisation channel(s). This venting of the pressurisable chamber to low pressure reduces the force urging the carrier module towards the runner, thus enabling separation of the sealing faces and reducing the likelihood of damage or failure of the components in the seal arrangement.

In a second aspect, the present invention provides a gas turbine engine having the air-riding seal arrangement of the first aspect. The air-riding seal may be used, for example, for sealing between interconnecting shafts of the engine, or between an interconnecting shaft and a stationary component within the engine.

Optional features of the invention will now be set out. These are applicable singly or in any combination with any aspect of the invention.

The air-riding seal arrangement may further have biasing means to bias the front portion of the carrier module to adopt the first rotation position. The biasing means may include one or more springs. For example, there may be plural circumferentially spaced springs, which act circumferentially on the front portion of the carrier module to provide a rotational force. However, the biasing means is not particularly limited, and may take the form of, for example, a hydraulic spring, or a torsional spring mounted on the front face. Air-riding seal arrangements including such biasing means are capable of recovering to an air-riding state from an HSTD event, as once depressurisation of the pressurisable chamber enables separation of the sealing faces, the biasing means can return the front portion of the carrier module to the first rotation position, and normal operation of the air-riding seal arrangement may resume. The degree of the biasing may be selected to tune the response in the case of a touchdown event. For example, a weaker spring will typically allow for a quicker response as the touchdown event occurs, but this must be balanced with the need to provide a spring which is strong enough to return the front portion to adopt the first rotation position.

A damper may be added to the biasing means to control oscillations produced by the biasing means under rapidly changing pressure conditions. The damper may take the form of, e.g. a respective shock absorber damping the, or each, spring.

However, it is not necessary for an air-riding seal arrangement of the present invention to have such biasing means. In the case that no such biasing means is present, when an HSTD event occurs, the front portion of the carrier member typically remains in the second rotation position, and does not return back to normal operation. This provides a "safe-fail" mechanism for the air-riding seal arrangement, advantageously avoiding wear and total failure of seal components. However, in such a "safe fail" scenario, leakage through the seal must be accepted until the seal can be repaired.

The other one of the front and rear portions of the carrier module may have one or more further channels formed therein, and the pressurisation and depressurisation channels formed in the carrier module, when opened, may fluidly communicate with the pressurisable chamber through these further channels. For example, when the front portion has the pressurisation and depressurisation channels, the further channels may extend (e.g. front to back) through the rear portion. As another example, when the rear portion has the pressurisation and depressurisation channels, in order for these channels to be able to fluidly connect with the pressurisable chamber, the rear portion may have one or more additional linking channels which link the further channels in the front portion to the pressurisable chamber.

The pressurisation and depressurisation channels may be opened by alignment of the pressurisation and depressurisation channels with the further channels, and closed by misalignment of the pressurisation and depressurisation channels with the further channels.

A first portion of the further channels may align with the pressurisation channels in the first rotation position and misalign with the pressurisation channels in the second rotation position, and a remaining second portion of the further channels may misalign with the depressurisation channels in the first rotation position and align with the depressurisation channels in the first rotation position. Thus the first portion of the further channels can be used for solely for pressurisation, and the second portion solely for depressurisation.

In this case, the air-riding seal arrangement may further having at least one ring seal located at a rotation interface of the front and rear portions of the carrier module, the pressurisation channels and the first portion of the further channels communicating, when aligned, on one radial side of the ring seal, and the depressurisation channels and the second portion of the further channels communicating, when aligned, on the other radial side of the ring seal. The ring seal may be an O-ring. It may be advantageous to use a PTFE ring seal, which reduces friction at the rotation interface during relative rotation of the front and rear portions of the carrier module.

However, it is not necessary for different portions of the further channels to be functionally separated as described above. For example, the, or each, further channel may align with a pressurisation channel when the front portion is in the first rotation position, and the same further channel may then align with a depressurisation channel when the front portion is in the second rotation position.

The total flow cross-sectional area of the depressurisation channel(s) may be greater than the total flow cross-sectional area of the pressurisation channel(s). Here, the flow cross-sectional area of the channels is the area of the channels as taken transverse to the flow direction through the channel. A larger depressurisation channel promotes rapid depressurisation of the pressurisable chamber, and accordingly rapid release of forces from the sealing faces such that the amount of damage caused by the HSTD event is reduced or minimised. The size of a pressurisation channel can be altered to balance a trade-off between leakage during the touchdown event caused if the seal is left open for too long, and the risk of a self-exciting oscillation if the cause of the touchdown persists and a second touchdown occurs after recovery.

The front portion of the carrier module may have plural circumferentially spaced pressurisation channels, and/or plural circumferentially spaced depressurisation channels. For example, there may be three pressurisation channels, and three depressurisation channels, although the number of channels is not particularly limited. The number of pressurisation channels and the number of depressurisation channels need not be equal to one another. The geometry and number of the pressurisation and depressurisation channels can be tuned to alter the time constant of the system.

The pressurisable chamber may be formed between the rear portion of the carrier module and a housing for the carrier module provided by the component to which the carrier module is mounted, the carrier module being axially slidable in the housing.

There may be two annular seals disposed between the carrier module and the housing to seal the pressurisable chamber, the two annular seals being respectively located at radially inner and radially outer sides of the carrier module.

The pressurisable chamber may extend into a recess formed in a rear face of the rear portion of the carrier member. This can assist in providing a sufficiently large volume for the pressurisable chamber.

The front portion of carrier member may be held to the rear portion of the carrier member by cooperating tabs and recesses formed in the front and rear portions, the tabs being slidable in a circumferential direction in the recesses. This arrangement of tabs and recesses may be referred to as a 'bayonet' arrangement.

The carrier module may have a stop formation to limit the amount of relative rotation of the front and rear portions of the carrier module. The stop formation may be formed, for example, by an end stop to limit sliding of a tab within a recess of a bayonet arrangement, or respective such end stops in the recesses of a bayonet arrangement. Providing such a formation can prevent over-rotation of the front portion of the carrier module in relation to the rear portion, and assist in defining the first and second rotation positions of the front portion of the carrier module.

The air-riding seal arrangement may further have a spring formation providing a further force urging the carrier module towards the runner. For example, such a formation can take the form of one or more compression springs acting between the rear portion of the carrier module and the aforementioned housing.

The air-riding seal arrangement of the present invention is not limited to use in any one technical field. Thus whilst it may find particular application in gas turbine engines, it is envisaged that it is suitable for use in any technical field where air-riding face seals are employed.

BRIEF DESCRIPTION OF THE DRAWINGS

Embodiments of the invention will now be described by way of example with reference to the accompanying drawings in which:

FIG. 6A shows part of a longitudinal half cross-section through the carrier module of FIGS. 3A and 3B in normal operation FIG. 6B shows part of a further longitudinal half cross-section through the carrier module of FIGS. 3A and 3B during a high speed touchdown event; and FIG. 7 shows schematically a partial longitudinal cross-section through a variant bayonet system for fixing the front portion of the carrier module to the rear portion of the carrier module.

DETAILED DESCRIPTION AND FURTHER OPTIONAL FEATURES

Figure 1:
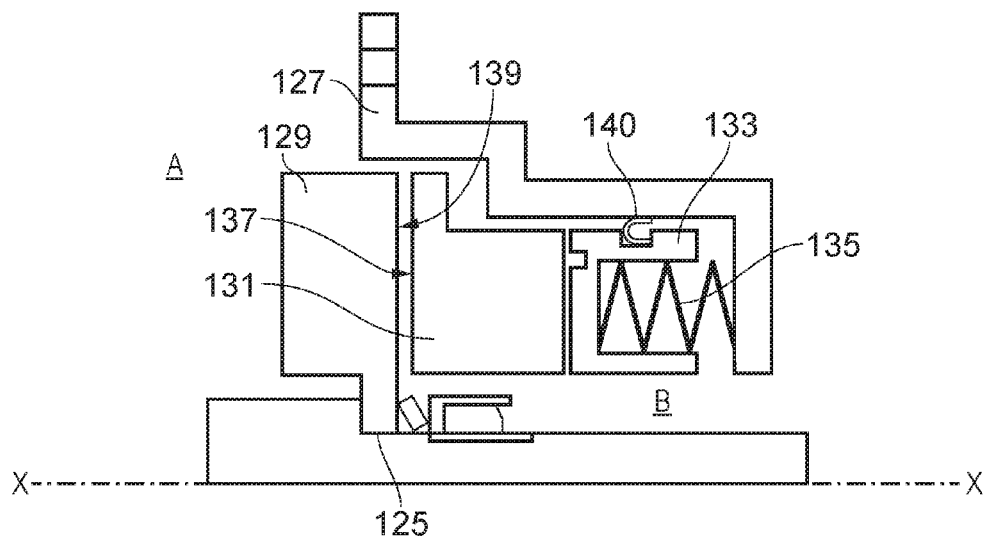
FIG. 1 shows schematically a longitudinal half cross-section through a conventional air-riding seal arrangement.
Figure 2:
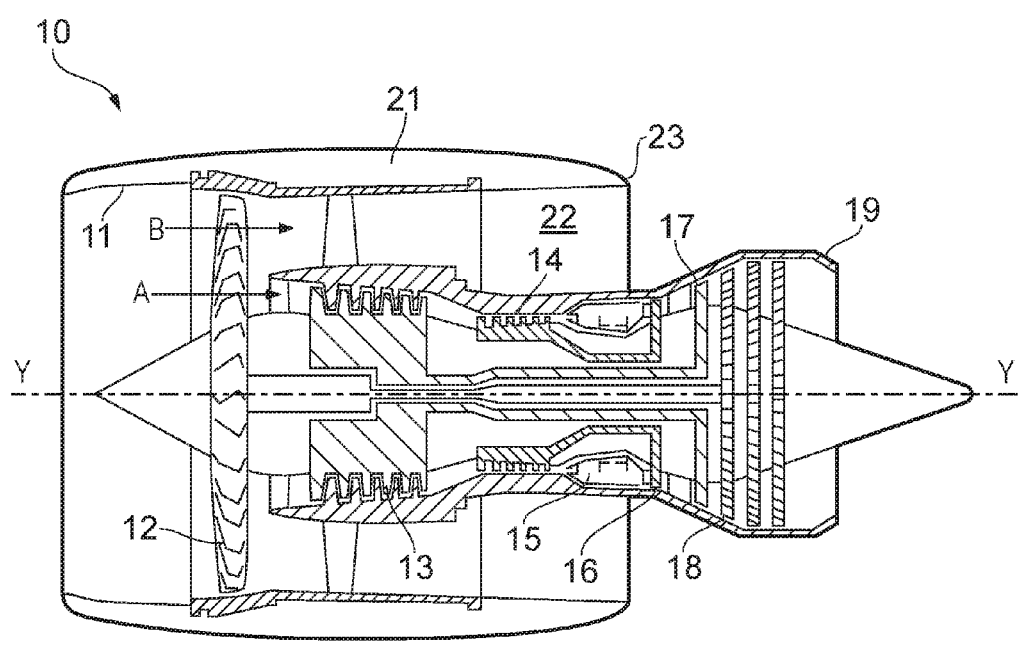
FIG. 2 shows a longitudinal cross-section through a ducted fan gas turbine engine.

With reference to FIG. 2, a ducted fan gas turbine engine incorporating the invention is generally indicated at 10 and has a principal and rotational axis Y-Y. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

An air-riding seal according to the present invention may be used, for example, for sealing between interconnecting shafts of the ducted fan gas turbine engine, or between an interconnecting shaft and a stationary component within the engine.

Figure 3A:
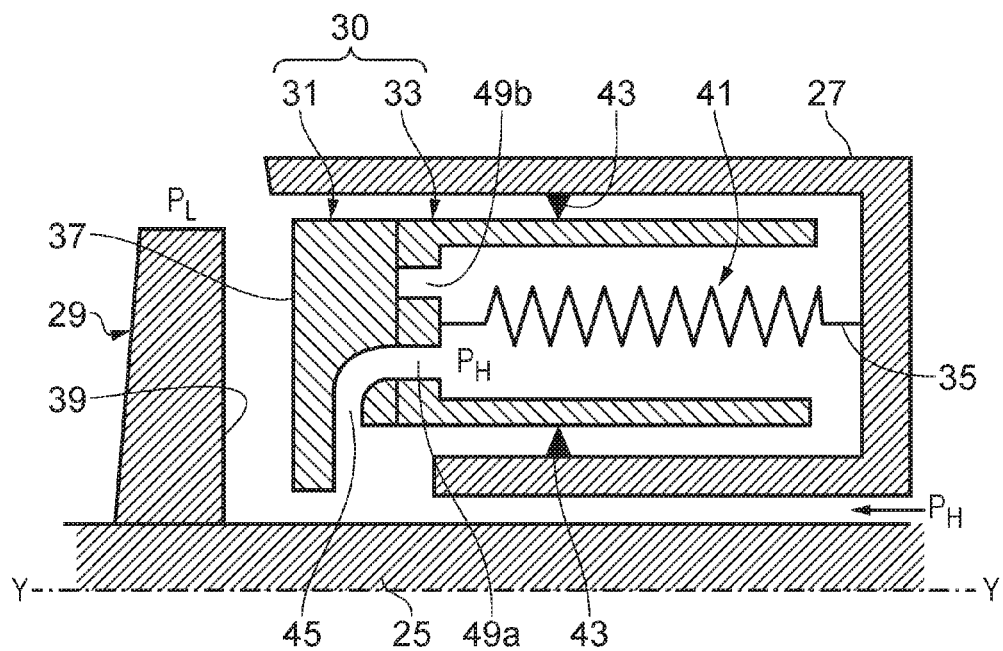
FIG. 3A shows schematic longitudinal half cross-sections through an air-riding seal arrangement in normal operation.
Figure 3B:
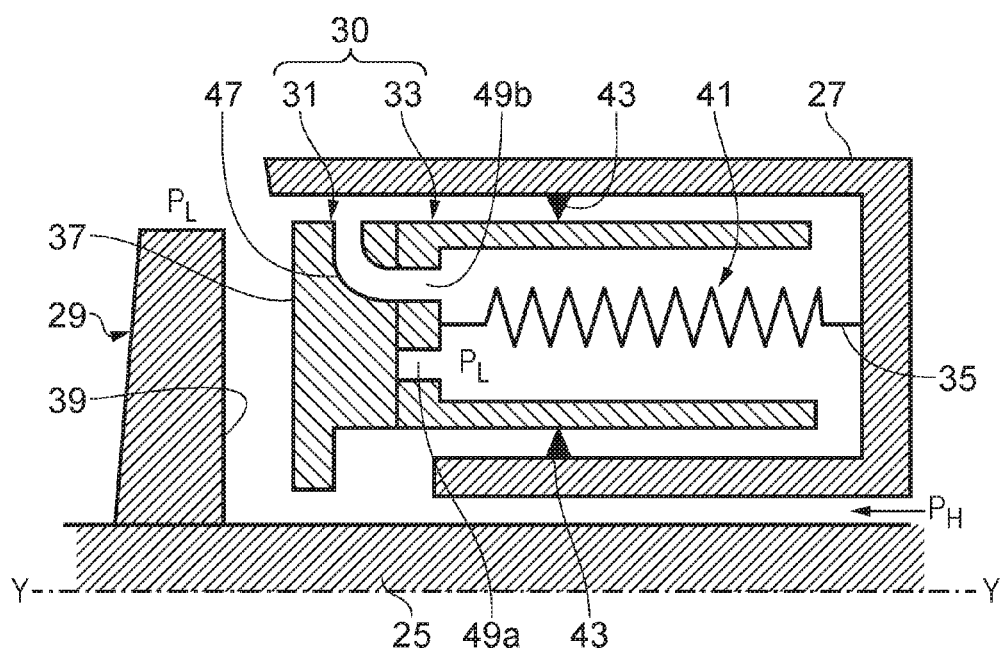
FIG. 3B shows schematic longitudinal half cross-sections through an air-riding seal arrangement in the event of a high speed touchdown event.

FIG. 3 shows schematic longitudinal half cross-sections through such an air-riding seal arrangement (a) in normal operation, and (b) in the event of an HSTD event. The air-riding seal arrangement is located between a first component 25 and a second component that are rotatable relative to one another about the rotation axis Y-Y. The seal arrangement includes an annular runner 29 provided by (e.g. mounted to or integrally formed with) the first component, and an annular and axially slidable carrier module 30 mounted in a housing 27 of the second component. A compression spring 35 or circumferential row of such springs is located in the housing to urge the carrier module towards the runner. The carrier module and the runner have respective and opposing annular sealing faces 37, 39. In a normal operation of the seal arrangement, these faces are axially spaced to form an air seal therebetween separating a high pressure region $P_H$ at one side of the air seal from a low pressure region $P_L$ at the other side of the air seal. The axial spacing between the two faces is typically ≤20 μm in order to provide a restriction in air flow sufficient to effect sealing. The direction of leakage air flow through the seal arrangement from the high pressure region to the low pressure region is arrowed.

The carrier module has a front portion 31 and a rear portion 33. The sealing face 37 of the carrier module is provided by the front portion. The front portion of the carrier module has first and second rotation positions relative to the rear portion, with the first rotation position being adopted in normal operation, and the second rotation position being adopted in the event of HSTD of the annular sealing faces, when contact between the sealing faces rotates the front portion to the second rotation position.

The seal arrangement further includes a pressurisable chamber 41 formed behind the rear portion of the carrier module, the pressure in the pressurisable chamber producing a force, in addition to that produced by the spring(s) 35, urging the carrier module towards the runner. Here, the pressurisable chamber is formed between the rear portion of the carrier module and the housing 27 in which the carrier module is mounted. There are two annular seals 43 which are disposed between the carrier module and the housing to seal the pressurisable chamber. The two annular seals are respectively located at radially inner and radially outer sides of the carrier module. These seals allow for axial sliding of the carrier module in the housing whilst retaining sealing of the pressurisable chamber. The pressurisable chamber extends into a recess formed in a rear face of the rear portion of the carrier member. This helps to increase the volume of the pressurisable chamber. The size of the recess can be adjusted to tune the response of the carrier module to an HSTD event (such tuning being discussed in more detail below).

The front portion 31 of the carrier module 30 has one or more pressurisation channels 45 and one or more depressurisation channels 47 formed therein, the pressurisation channels extending to the high pressure region at one side of the air seal, and the depressurisation channels extending to the low pressure region at the other side of the air seal. The rear portion 33 of the carrier module has further channels 49a, b extending therethrough, and the pressurisation and depressurisation channels formed in the front portion of the carrier module fluidly communicate with the pressurisable chamber, when opened, by alignment of the pressurisation channels with a first (inner) portion 49a of the further channels, and alignment of depressurisation channels with a second (outer) portion 49b of the further channels.

More particularly, when the front portion of the carrier module 30 is in the first rotation position (FIG. 3(*a*)) the pressurisation channels 45 are aligned with the first portion 49a of the further channels, and are thus opened to fluidly connect the pressurisable chamber 41 with the high pressure region $P_H$. Whilst in this first rotation position, the depressurisation channels 47 are closed because they are misaligned with the second portion 49b of the further channels. When the front portion of the carrier module is in the second rotation position (FIG. 3(*b*)), the depressurisation channels 47 are aligned with the second portion 49b of the further channels, and are thus opened to fluidly connect the pressurisable chamber with the low pressure region $P_L$, thereby reducing the force urging the carrier module towards the runner 29. Whilst in this second rotation position, the pressurisation channels 45 are closed because they are misaligned with the first portion 49a of the further channels. Accordingly, when the front face of the carrier module is moved to the second rotation position as a result of an HSTD event, the relief of the pressure within the pressurisable chamber to the low pressure side of the seal arrangement and the ensuing reduction in the force urging the carrier module towards the runner produce a separation of the sealing faces 37, 39.

Figure 4A:
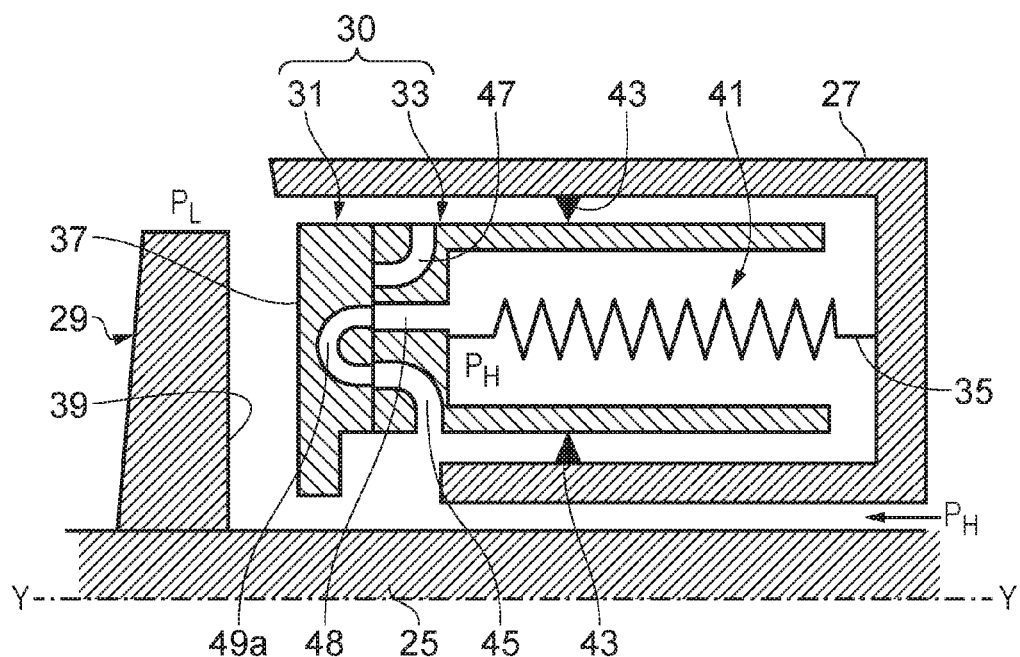
FIG. 4A shows schematic longitudinal half cross-sections through a variant air-riding seal arrangement in normal operation.
Figure 4B:
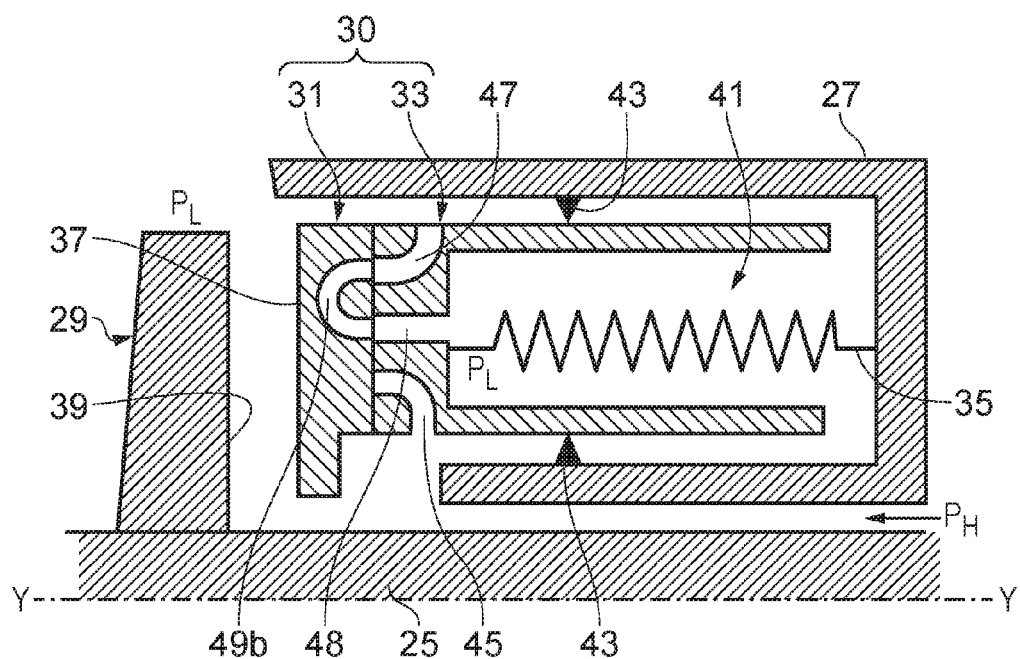
FIG. 4B shows schematic longitudinal half cross-sections through a variant air-riding seal arrangement in the event of a high speed touchdown event.
Figure 5A:
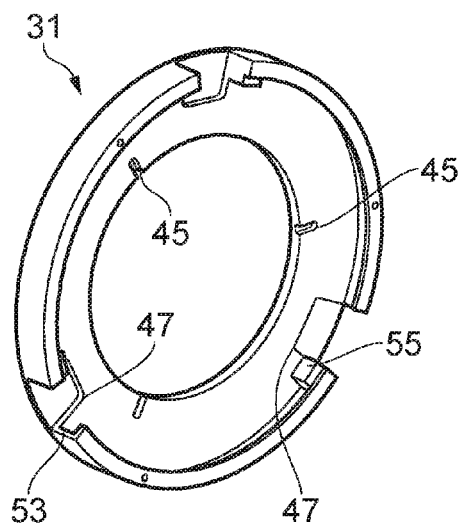
FIG. 5A shows a perspective view of the rear side of a front portion of a carrier module of FIGS. 3A and 3B.
Figure 5B:
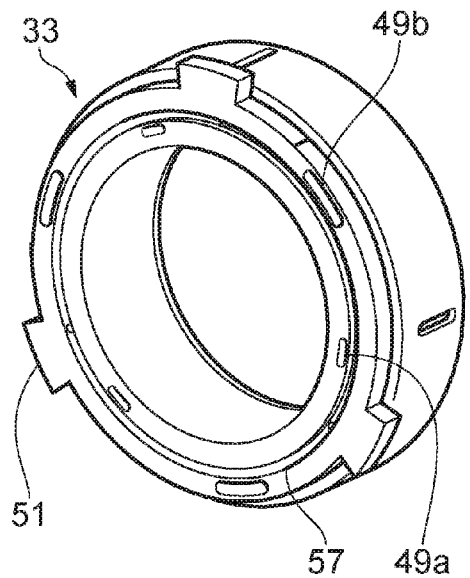
FIG. 5B shows a perspective view of the front side of a rear portion of the carrier module.
Figure 5C:
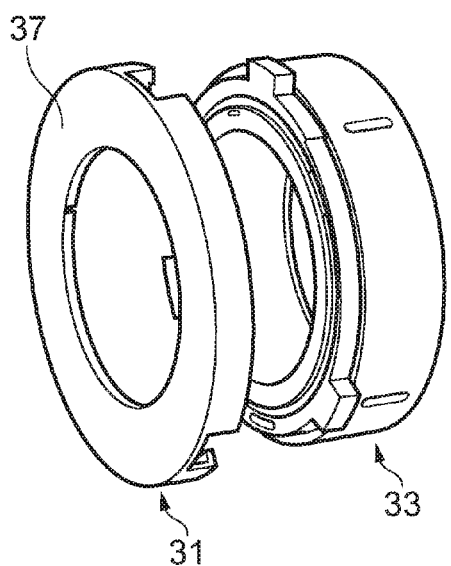
FIG. 5C shows a perspective exploded view of the front and rear portions of the carrier module.
Figure 5D:
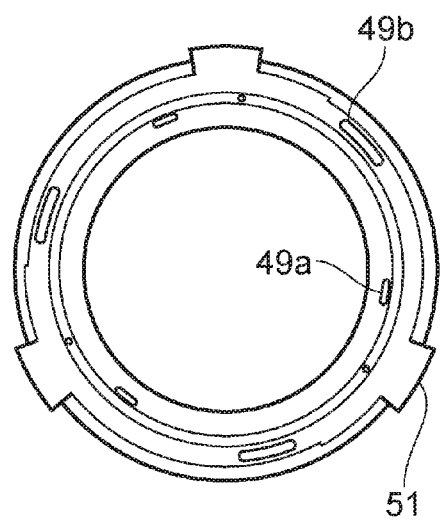
FIG. 5D shows a plan view of the front side of the rear portion of the carrier module.

FIG. 4 shows schematic longitudinal half cross-sections through a variant air-riding seal arrangement (a) in normal operation, and (b) in the event of a high speed touchdown event. In this variant, the pressurisation and depressurisation channels 45, 47 are formed in the rear portion 33 of the carrier module 30. Linking channels 48 are also formed in the rear portion of the carrier module. The first (inner) portion 49a and the second (outer) portion 49b of the further channels are formed in the front portion 31 of the carrier module. When the front portion of the carrier module is in the first rotation position (FIG. 4(*a*)) the pressurisation channels are in fluid communication with the pressurisable chamber 41, by simultaneous alignment of the pressurisation channels 45, the first portion 49a of the further channels, and the linking channels 48. Whilst in this first rotation position, the depressurisation channels 47 are closed because they are misaligned with the second portion 49b of the further channels. When the front portion of the carrier module is in the second rotation position (FIG. 4(*b*)), the depressurisation channels 47 are in fluid communication with the pressurisable chamber 41, by simultaneous alignment of the depressurisation channels 47, the second portion 49b of the further channels, and the linking channels 48, thereby reducing the force urging the carrier module towards the runner 29. Whilst in this second rotation position, the pressurisation channels 45 are closed because they are misaligned with the first portion 49a of the further channels.

FIG. 5 shows (a) a perspective view of the rear side of the front portion 31 of the carrier module of FIG. 3, (b) a perspective view of the front side of the rear portion 33 of the carrier module, (c) a perspective exploded view of the front and rear portions of the carrier module, and (d) a plan view of the front side of the rear portion of the carrier module. FIG. 6 shows (a) part of a longitudinal half cross-section through the carrier module of FIG. 3 in normal operation when the front portion 31 of the carrier module is in the first rotation position, and (b) part of a further longitudinal half cross-section through the carrier module of FIG. 3 during an HSTD event when the front portion is in the second rotation position. In particular, FIGS. 5 and 6 show in more detail one arrangement of the pressurisation 45 and depressurisation 47 channels in the front portion of the carrier module, a corresponding arrangement of the further channels 49a, b in the rear portion of the carrier module, and a bayonet connection system between the two portions.

Three of the pressurisation channels 45, and three of the depressurisation channels 47 are formed in the front portion 31 of the carrier module. Correspondingly, there are six further channels 49a, b formed in the rear portion 33 of the carrier module, an inner three of these being a first portion 49a arranged to align with the pressurisation channels 45 when the front portion of the carrier module is in the first rotation position, and an outer three being a second portion 49b arranged to align with the depressurisation channels 47 when the front portion of the carrier module is in the second rotation position. The pressurisation channels open to a radially inwardly directed face of the front portion at the high pressure side of the seal arrangement, and the depressurisation channels open to a radially outwardly directed face of the front portion at the low pressure side of the seal arrangement. The depressurisation channels have a combined flow cross-sectional area which is significantly larger than the combined flow cross-sectional area of the pressurisation channels. This allows relatively rapid venting of the pressurisable chamber to low pressure when in the second rotation position, and additionally allows a relatively slow re-pressurisation of the pressurisable chamber once the source of torque has been removed, which can help to ensure that the cause of an HSTD event has been removed before normal operation is reinstated.

Circumferentially spaced springs 59 (illustrated in the cross-section of FIG. 6(a)) bias the front portion of the carrier module to adopt the first rotation position. These springs act between the front and the rear portions of the carrier module to bias the front portion of the carrier module to adopt the first rotation position. Accordingly, once the torque applied to the front portion of the carrier member during an HSTD event is removed by depressurisation of the pressurisable chamber 41, the springs 59 return the front portion of the carrier module to the first rotation position, and normal operation of the air-riding seal arrangement may resume.

Whilst selection of the number and geometry of pressurisation 45 and depressurisation 47 channels is one way to tune the response of the air-riding seal arrangement to a HSTD event, there are other features of the arrangement that may also be adjusted to tune the response. Examples of such features are: the strength of the compression spring(s) 35 which urge the carrier module towards the runner 29; the volume of the pressurisable chamber 41; frictional resistance to sliding between the front 31 and rear 33 portions of the carrier module; and, the strength and number of circumferentially spaced springs 59 which bias the front portion of the carrier module to adopt the first rotation position.

The front side of the rear portion 33 has an annular groove 57 formed therein. In use, this groove carries a ring seal located at the rotation interface between the front 31 and rear portions of the carrier module. As best shown in FIG. 5, the pressurisation channels 45 and the first portion 49a of the further channels align at one radial side of the ring seal, and the depressurisation channels 47 and the second portion 49b of the further channels align at the other radial side of the ring seal. In this way, leakage across the rotation interface from high to low pressure can be reduced or eliminated. Variant air-riding seal arrangements, such as those shown in FIG. 4, may have two such ring seals e.g. one radially inwards of the linking channels 48 and one radially outwards of the linking channels 48.

Regarding the bayonet connection system, the rear portion 33 of the carrier module has three outwardly projecting tabs 51 which engage with respective cooperating recesses 53 formed in the rim of the front portion 31. The tabs are slideable in a circumferential direction in the recesses, thereby enabling relative rotation of the front and rear portions, whilst preventing relative axial movement therebetween so that the rear side of the front portion maintains a contacting, rotation interface with the front side of the rear portion. Respective end stops 55 formed in the front portion limit the amount of relative rotation of the front and rear portions of the carrier module. Conveniently, there can be three of the circumferentially spaced springs 59 which bias the front portion of the carrier module to adopt the first rotation position each located in a respective one of the recesses.

The arrangement of tabs 51 and recesses 53 in the bayonet connection system may be reversed such that the tabs are provided by the front portion and recesses by the rear portion. Moreover, the geometry and position of the tabs and recesses can be altered. For example, FIG. 7 shows schematically a partial longitudinal cross-section through a variant bayonet system for connecting the front portion of the carrier module to the rear portion of the carrier module. In the variant system, the tabs 51 project rearwardly from the rear side of the front portion of the carrier module, and the cooperating recesses 53 in which the tabs are engaged are formed as cavities in the front side of the rear portion of the carrier module.

While the invention has been described in conjunction with the exemplary embodiments described above, many equivalent modifications and variations will be apparent to those skilled in the art when given this disclosure. For example, the air-riding seal arrangement may have no biasing means (i.e. springs 59) biasing the front portion of the carrier module to adopt the first rotation position. In this case, the seal arrangement remains in the second rotation position when an HSTD event occurs. Sealing performance is thus compromised after an HSTD event until the seal arrangement can be repaired, but the risk of total failure of the seal arrangement can be reduced. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An air-riding seal arrangement between two components that are rotatable relative to each other about a rotation axis, the seal arrangement including an axially slidable carrier module mounted to one of the components and a runner provided by the other of the components, the carrier module and the runner having respective and opposing annular sealing faces which, in a normal operation of the seal arrangement, are axially spaced to form an air seal therebetween separating a high pressure region at one side of the air seal from a low pressure region at another side of the air seal, wherein:

the carrier module has a front portion and a rear portion, the sealing face of the carrier module being provided by the front portion, and the front portion having first and second rotation positions relative to the rear portion, the first rotation position being adopted in the normal operation, and the second rotation position being adopted in an event of high speed touchdown of the annular sealing faces when contact between the sealing faces rotates the front portion to the second rotation position;

the seal arrangement further includes a pressurisable chamber formed behind the rear portion of the carrier module, the pressure in the pressurisable chamber producing a force urging the carrier module towards the runner;

a first one of the front and rear portions of the carrier module has one or more pressurisation channels and one or more depressurisation channels formed therein, the pressurisation channels extending to the high pressure region at one side of the air seal, and the depressurisation channels extending to the low pressure region at the other side of the air seal; and the other one of the front and rear portions of the carrier module is adapted such that: (i) in the first rotation position the, or each, pressurisation channel is opened to fluidly connect the pressurisable chamber with the high pressure region, and the depressurisation channel(s) is closed; and (ii) in the second rotation position the pressurisation channel(s) is closed, and the, or each, depressurisation channel is opened to fluidly connect the pressurisable chamber with the low pressure region, thereby reducing the force urging the carrier module towards the runner.

2. An air-riding seal arrangement according to claim 1, further having biasing means to bias the front portion of the carrier module to adopt the first rotation position.

3. An air-riding seal arrangement according to claim 2, wherein the biasing means includes one or more springs.

4. An air-riding seal arrangement according to claim 1, wherein the other one of the front and rear portions of the carrier module has one or more further channels formed therein, and the pressurisation and depressurisation channels, when opened, fluidly communicate with the pressurisable chamber through the further channels.

5. An air-riding seal arrangement according to claim 4, wherein the pressurizable and depressurisable pressurizable channels are opened by alignment of the pressurizable and depressurisable pressurizable channels with the further channels, and closed by misalignment of the pressurizable and depressurisable pressurizable channels with the further channels.

6. An air-riding seal arrangement according to claim 4, wherein a first portion of the further channels align with the pressurizable channels in the first rotation position and misalign with the pressurizable channels in the second rotation position, and a remaining second portion of the further channels misalign with the depressurisable pressurizable channels in the first rotation position and align with the depressurisable pressurizable channels in the second rotation position.

7. An air-riding seal arrangement according to claim 6, further having a ring seal located at a rotation interface of the front and rear portions of the carrier module, the pressurisation channels and the first portion of the further channels communicating, when aligned, on one radial side of the ring seal, and the depressurisation channels and the second portion of the further channels communicating, when aligned, on another radial side of the ring seal.

8. An air-riding seal arrangement according to claim 1, wherein a total flow cross-sectional area of the depressurisation channel(s) is greater than a total flow cross-sectional area of the pressurisation channel(s).

9. An air-riding seal arrangement according to claim 1, wherein the front portion of the carrier module has plural circumferentially spaced pressurizable channels, and/or plural circumferentially spaced depressurisable pressurizable channels.

10. An air-riding seal arrangement according to claim 1, wherein the pressurizable chamber is formed between the rear portion of the carrier module and a housing for the carrier module provided by the component to which the carrier module is mounted, the carrier module being axially slidable in the housing.

11. An air-riding seal arrangement according to claim 10, wherein the air-riding seal arrangement further has two annular seals disposed between the carrier module and the housing to seal the pressurizable chamber, the two annular seals being respectively located at radially inner and radially outer sides of the carrier module.

12. An air-riding seal arrangement according to claim 1, wherein the pressurizable chamber extends into a recess formed in a rear face of the rear portion of the carrier member.

13. An air-riding seal arrangement according to claim 1, wherein the front portion of carrier member is held to the rear portion of the carrier member by cooperating tabs and recesses formed in the front and rear portions, the tabs being slidable in a circumferential direction in the recesses.

14. An air-riding seal arrangement according to claim 1, wherein the carrier module has a stop formation to limit the amount of relative rotation of the front and rear portions of the carrier module.

15. A gas turbine engine comprising the air-riding seal arrangement of claim 1.

* * * * *